United States Patent [19]
Sorathia et al.

[11] Patent Number: 5,383,567
[45] Date of Patent: Jan. 24, 1995

[54] PROTECTIVE DEVICE FOR CONTAINER

[75] Inventors: Usman A. Sorathia, Arnold; Deborah A. Houghton, Annapolis; David P. Owen, Pasadena, all of Md.; Markus R. Pipyne, Burke, Va.; Wayne C. Jones, Catonsville, Md.; Vincent J. Castelli, Severna Park, Md.; Eugene C. Fischer, Stevensville, Md.; Ravanasamudram S. Venkatachalam, Arnold, Md.; Douglas Loup, Pasadena, Md.; Carlisle R. Stephenson, Rockville, Md.

[73] Assignee: The United States of America as represented by the Secretary of the Navy, Washington, D.C.

[21] Appl. No.: 125,713

[22] Filed: Sep. 24, 1993

[51] Int. Cl.6 .............................................. B65D 90/02
[52] U.S. Cl. .................................. 220/4.13; 220/4.24; 220/737; 220/900; 428/36.1
[58] Field of Search ...................... 220/900, 4.13, 4.21, 220/4.24, 737; 428/36.1

[56] References Cited

U.S. PATENT DOCUMENTS

| | | | |
|---|---|---|---|
| 3,509,016 | 4/1970 | Underwood et al. | 220/900 |
| 3,698,587 | 10/1972 | Baker et al. | 220/900 |
| 3,725,120 | 4/1973 | Suter | 220/900 |
| 3,787,279 | 1/1974 | Winchester | 220/900 |
| 3,801,425 | 4/1974 | Cook | 220/900 |
| 4,216,803 | 8/1980 | Hall | 220/900 |
| 4,376,489 | 3/1983 | Clemens | 220/900 |
| 4,428,998 | 1/1984 | Hawkinson | 220/900 |
| 4,597,425 | 7/1986 | Tally | 220/900 |
| 4,871,598 | 10/1989 | Potente et al. | 220/900 |
| 4,930,651 | 6/1990 | Szego | 220/900 |

*Primary Examiner*—Joseph Man-Fu Moy
*Attorney, Agent, or Firm*—Gary G. Borda

[57] ABSTRACT

A protective device for a container containing toxic or hazardous materials, includes a shell, a mechanism positioned in the shell for sealing a puncture in the container so as to prevent release of the toxic materials from the container and a mechanism for attaching the shell to the container.

18 Claims, 7 Drawing Sheets

PROTECTIVE DEVICE FOR CONTAINER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention generally relates to a protective device used in sealing containers so that even upon puncture the materials i.e., toxic or hazardous liquids or particulates, etc. in the containers are not evacuated or leaked into the surrounding environment, and more particularly to a removable protective device to prevent the release of molten lithium and to eliminate the subsequent fire hazard if the boiler section of a torpedo is pierced during storage.

2. Description of the Related Art

The MK50 torpedo is a new torpedo which has been designed with reduced weight and a new, boiler concept to increase its range and speed. Generally, torpedoes include a plurality of different stages to include a casing and a boiler for supplying power for torpedo propulsion. The boiler is operated by an initiator being ignited to heat a solid mass such as lithium to the molten state. Torpedoes are housed in submarines or the like typically in very confined, enclosed environments.

Thus, the boiler in the MK50 torpedo utilizes molten lithium as a heat source for its propulsion. Under normal storage conditions, the lithium poses no danger because it is stored in an environment well below its melting point of 186 degrees C. and the solid lithium mass is contained within the sealed boiler system. Even if a shock accidentally sets off the initiator charge used to heat the solid lithium to the molten state (i.e., above 186 degrees C.), so long as the boiler remains intact there is no danger to nearby equipment or personnel because the lithium is entirely self-contained within the boiler.

However, a major safety hazard can occur when the boiler section is pierced and the lithium reaction is simultaneously initiated. If the boiler section is pierced to form a hole therein and if the lithium reaction is initiated simultaneously with the puncture of the boiler section, molten lithium is released through the hole in the boiler and reacts with water, water vapor, and air to spontaneously ignite. The spontaneous ignition may cause a fire and/or produce sufficient hydrogen gas in an enclosed area to cause an explosion. There are currently no methods of minimizing or alleviating such a safety hazard.

SUMMARY OF THE INVENTION

It is therefore an object of the present invention to eliminate the above-described safety hazard with minimal impact on surrounding systems and existing operating procedures.

Another object of the invention is to provide a protective device to prevent the release of toxic products in a container and to eliminate the subsequent safety hazard if the container is inadvertently pierced during storage.

A third object is to provide the protective device for mounting on a container.

A fourth object is to provide a protective device, adapted to be mounted on a torpedo (i.e., a MK50 torpedo), to prevent the release of molten lithium or the like and to eliminate the subsequent fire hazard if the boiler section of the torpedo is inadvertently pierced during storage.

Another object of the present invention is to provide a safety feature for a torpedo which is inexpensive and easily installed, which has minimal impact on surrounding systems and current torpedo handling procedures, and which requires minimal maintenance.

In a first aspect of the invention as applied to a MK50 torpedo, a precompressed foam, with or without additives and contained within a shell, is clamped around a torpedo boiler section and is utilized for protecting the torpedo. Specifically, the precompressed foam is for preventing the escape of molten lithium caused by accidental punctures to the torpedo boiler section.

In a second aspect of the present invention, the risk of fire and/or explosion, as a result of a penetration of the MK50 boiler during storage, is minimized without impacting on its design and performance characteristics. The safety device is easily installed, inexpensive, has little impact on surrounding systems and current handling procedures, and requires minimal maintenance. Indeed, as compared to, for example, including more and heavier armor plating on the container to prevent the puncture thereof, the safety device according to the invention has minimal impact on the layout and configuration of surrounding systems and the handling (e.g., manual or otherwise) of the container. Increasing the armor on the container itself would adversely affect both handling and the layout of the surrounding systems (e.g., space and weight constraints).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
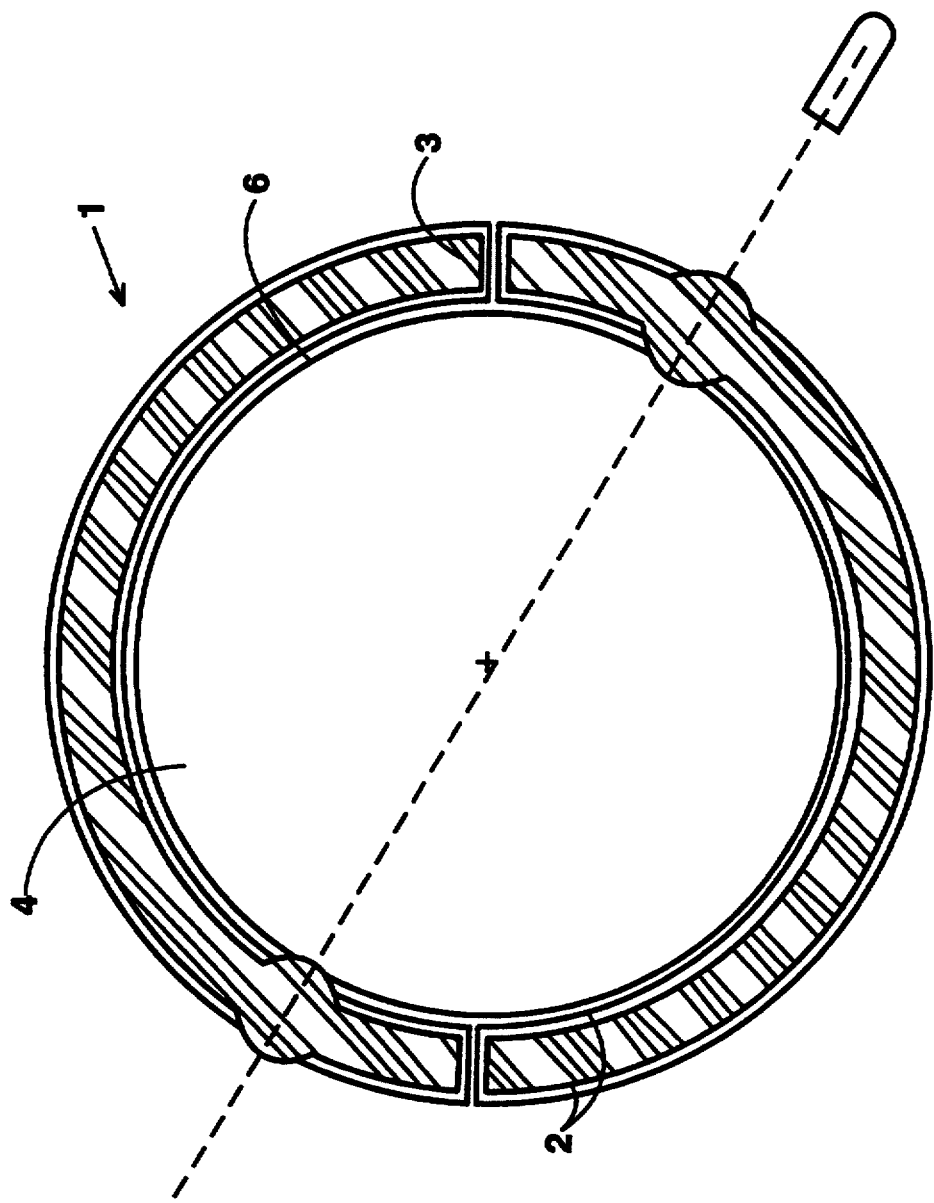
FIG. 1 is a cross-section of an embodiment of the protective device according to the invention.

Referring now to the drawings, and more particularly to FIG. 1, there is shown a protective device 1 according to the present invention which includes a clamp-on shell 2 containing a polymer sealing system 3, which is securably and releasably attached around the boiler section while the torpedo 4 is in storage.

Figure 2A:
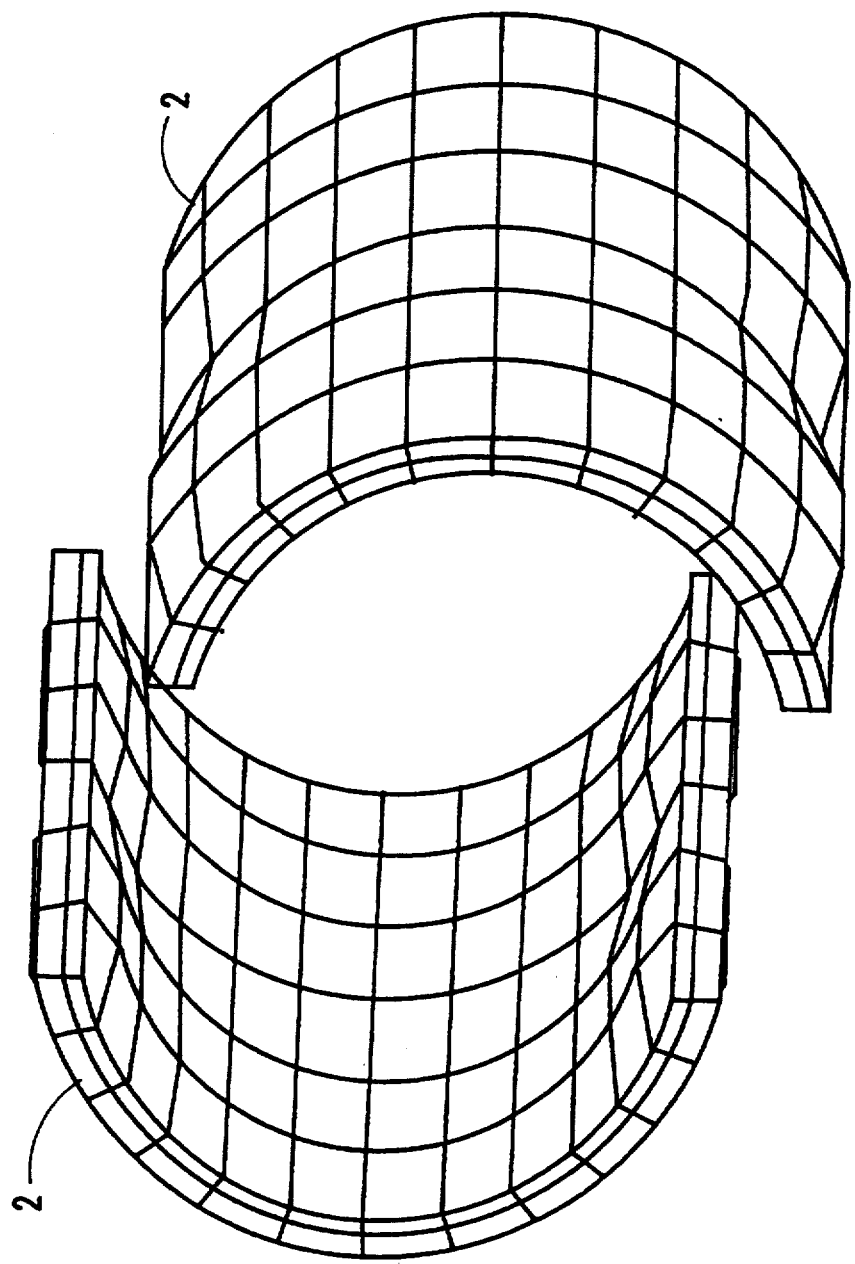
FIGS. 2A and 2B are each perspective views of the shell sections of the protective device of FIG. 1.

The shell 2 preferably is constructed of high temperature composite materials, such as a phenolic matrix with glass fiber reinforcement, or the shell may be formed of metal(s) (e.g., steel) which is (are) not prone to bulging or tearing upon impact by a projectile. Further, a combination of steel webs and glass composite materials may be advantageously employed to provide desired strength of materials. For example, FIG. 2A illustrates glass composite skins on a steel web/frame.

Figure 2B:
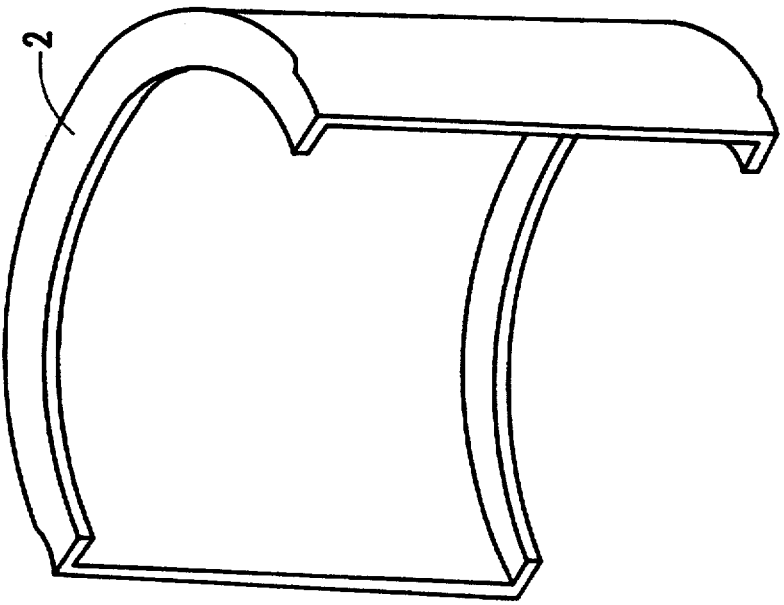
Figure 2B:
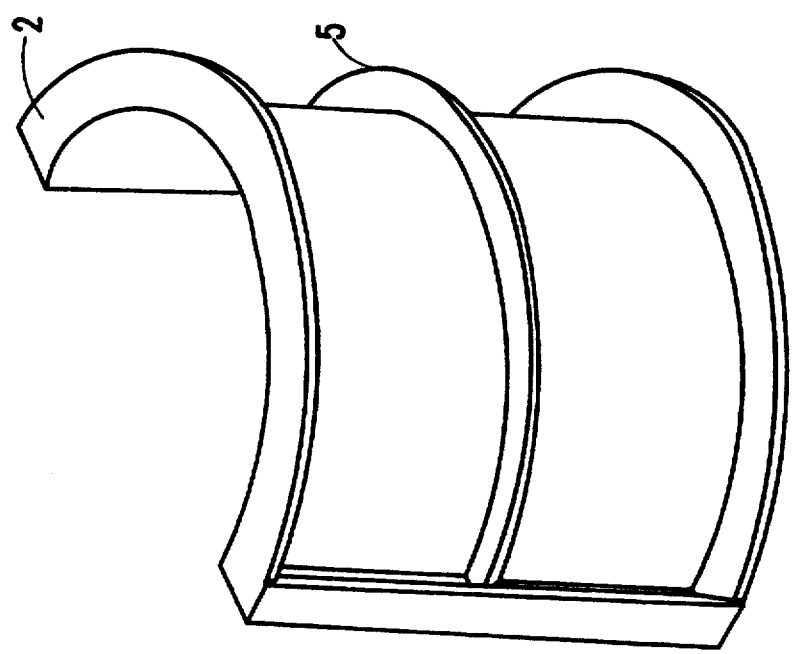
Figure 3:
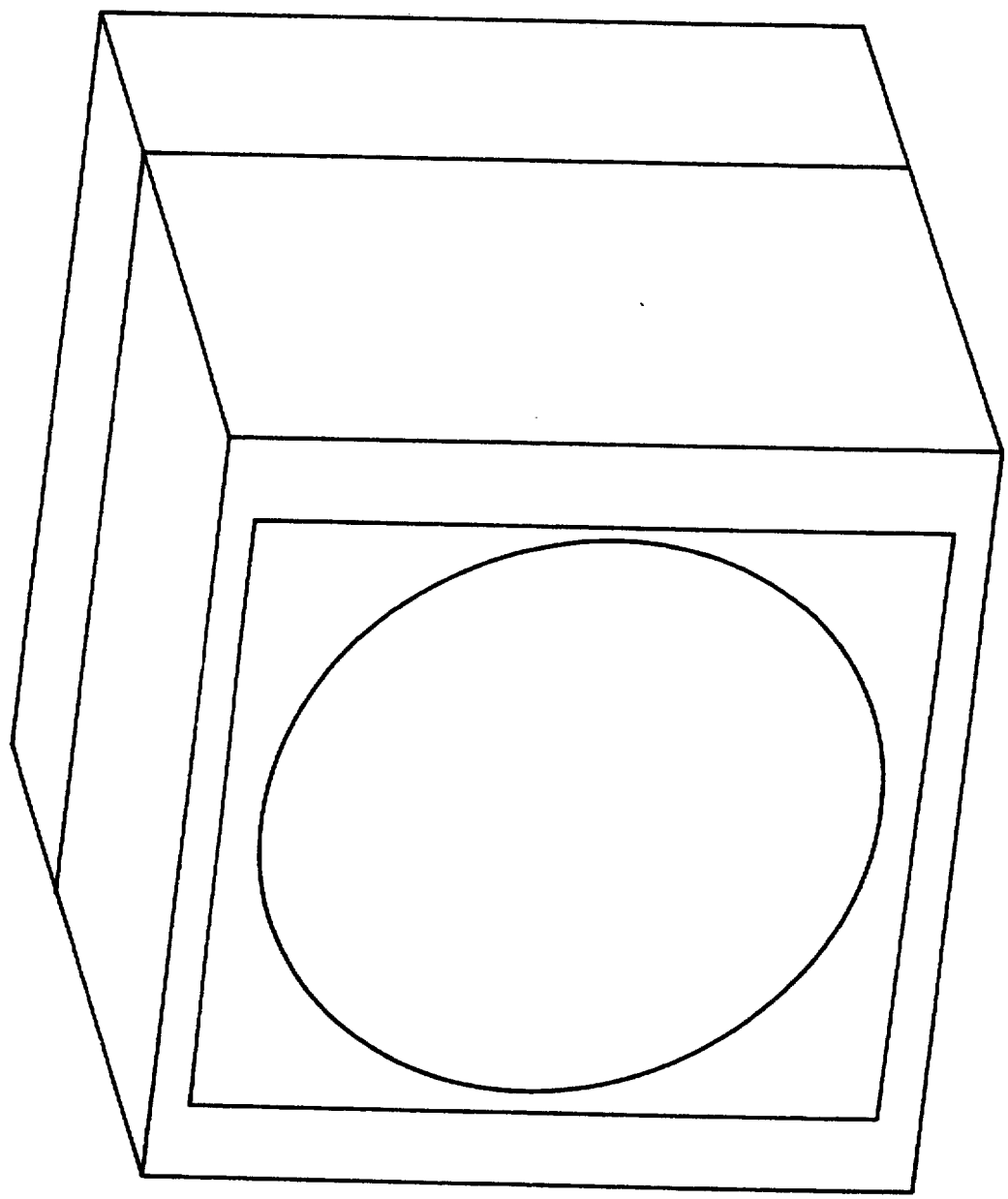
FIGS. 3 and 4 illustrate rectangularly-shaped shell sections.
Figure 4:
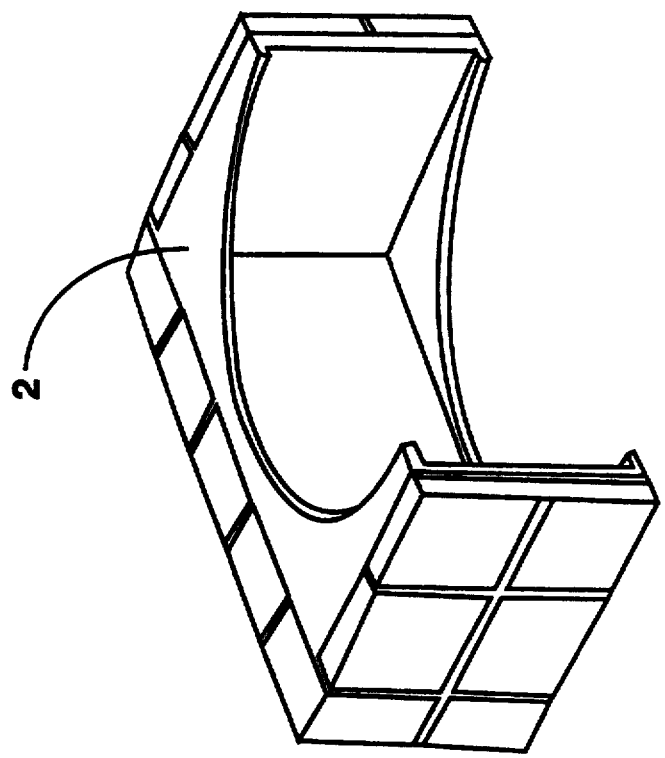
Figure 4:
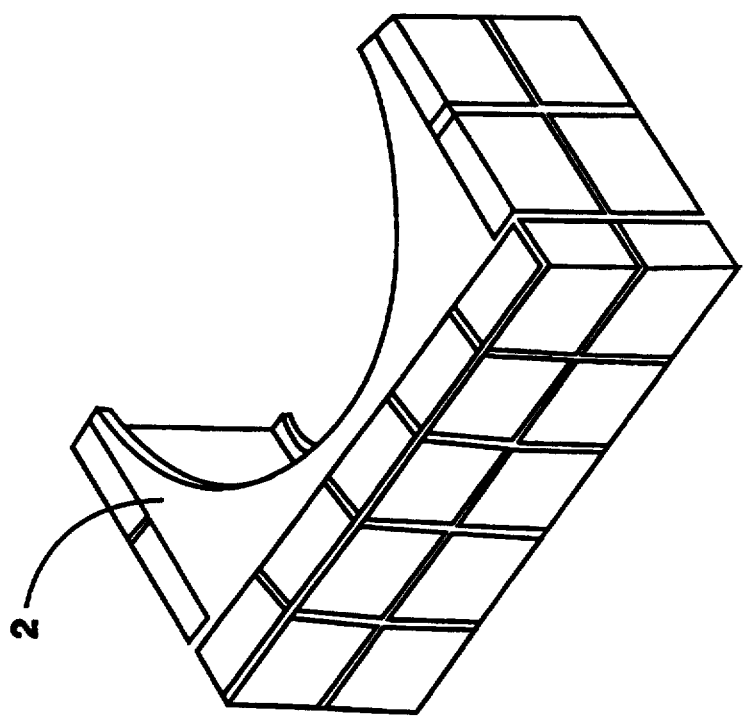

The shell 2 may includes a plurality (e.g., two) of sections, with each section including portions, e.g., two halves, that clamp together mechanically by suitable means such as by surface mounted latches or high temperature metal hook and loop fastening tape, so that the shell sections can be removed as the torpedo is lifted from a storage rack. The shell sections are assembled or fastened together by self-clinching floating fasteners or blind rivets. The halves are preferably cylindrically shaped, as shown in FIGS. 2A and 2B, but may have any desired shape so long as the shell provides protection to the torpedo. For example, FIGS. 3–4 illustrate a rectangularly shaped shell. The length of the shell is suitably long to encompass the entire boiler section of the torpedo.

The shell 2 has thin composite or metal, e.g., steel, inner and outer skins which serve to contain the sealing system and provide a method of attaching the protective system to the torpedo body. As shown in FIG. 2B, the shell may include stiffening ribs 5 for providing strength to the outer wall of the cylindrical shell. By virtue of such ribs, the cylindrical shell walls may have a reduced thickness.

The outer diameter of the shell is preferably less than 15 inches and the inner diameter is preferably no more than 13 inches. A thin layer of gasket material 6 is preferably positioned between the torpedo body and the inner skin. Preferably, there is at least 0.75 inches between the inner and outer skins of the shell, to accommodate the sealing system. The gasket material 6 reliably positions the shell on the torpedo and is for providing a snug fit for the shell on the torpedo and providing a seal to prevent leakage around the shell, and preferably is made of a high temperature silicone impregnated ceramic fabric or a high temperature silicone elastomer.

Figure 5:
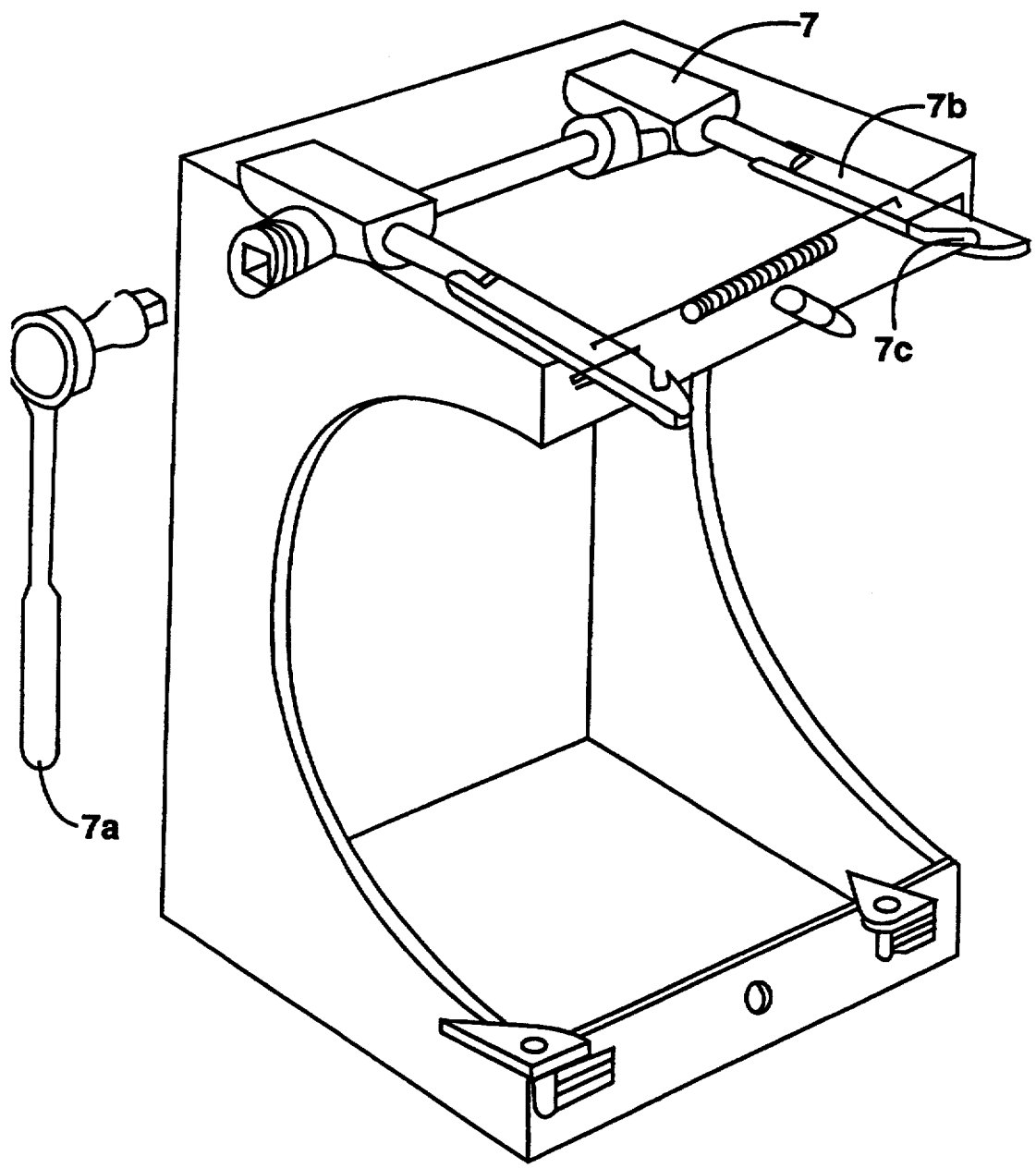
FIG. 5 illustrates an attaching means according to the invention.

A suitable attaching arrangement 7 for mechanically attaching the halves together around the torpedo body includes a latching device or the like, as shown for example in FIG. 5, for engaging a loop-like structure or the like on the second shell portion. The latching device of FIG. 5 is actuated by a ratchet wrench 7a or the like to actuate the latches 7b in turn. Latches 7b have hooks 7c at their ends to respectively engage the loops of the second shell portion (not illustrated). The structure of the attaching arrangement is not critical so long as the sealing device is securably attached to the container (e.g., the MK50 torpedo in the illustrated embodiment) and is easily removable therefrom. Thus, alternatively to the latching device shown in FIG. 5 for engaging a loop structure on the second shell portion, the attaching arrangement can comprise surface-mounted latches or a high temperature hook and loop fastening tape so that the shell sections can be removed as the torpedo is lifted from a storage rack. One of the major advantages of this clamp-on system is that it minimizes the risk of fire and/or explosion as a result of a penetration of the container (e.g., MK50 torpedo boiler) during storage, without impacting on its design characteristics when in actual use. Further, the latching device allows the protective system to be easily installed, without significantly impacting surrounding systems and current handling procedures.

The shell 2 preferably provides partial, passive protection from penetrations as well as the system for totally containing the polymer sealing system by means of its hardness and impact resistance. However, a reinforced phenolic matrix composite or a relatively thin layer of steel can perform the dual functions of light armoring and foam containment with an increase in weight of the structure of the sealing device.

The polymer sealing system 3 preferably comprises a silicone polymer foam which is precompressed within the shell, as discussed in further detail below. Alternatively, the polymer sealing system uses other suitable high temperature foams precompressed within the shell.

Among suitable silicone polymer foams is a two-part silicone foam material commercially available from InstaFoam under the tradename of "Insta-Foam" which is a two-part silicone foam material used as a fire-stop and insulating material. It contains graphite powder, can be mixed in a range of ratios to form a foamed product and has a rise time under two minutes in a standard mix ratio. The density of the foam can be controlled by forming the foam in a closed mold using varying initial quantifies of material. This foam was not damaged by exposure to molten lithium at 500 degrees C. for five minutes. However, this foam has a drawback in that it is somewhat brittle, with poor resistance to compression set and poor tear strength.

Other silicone foams investigated were a J-type Silastic Silicone elastomer and a special toughened system Q37309 Silicone Foam Base and Q37309 curing agent, which are commercially available from Dow Corning. The Q37309 Silicone Foam Base and curing agent system is a two-component system with good high temperature performance and low flammability. It can be molded in densities from 15 lb/ft$^3$ to 50 lb/ft$^3$ and its properties can be significantly improved by proper postcuring at moderate temperatures. It has acceptable tensile strength and tear strength and a rise time of 1–2 minutes.

Preferably, the Q37309 Silicone Foam (or the other foam(s) discussed above) is mechanically compressed in the containment shell 2 between the inner and outer walls of the shell. The shell is attached to the container by means of the attaching arrangement 7. Upon penetration of the shell and container by a projectile or the like, as shown, for example, in FIG. 1, the stored forces within the foam are used to cause expansion into the hole created by the penetration.

This plugging effect by the foam into the hole does not depend upon any chemical reactions taking place so considerations of storage stability of components, reaction rates at different temperatures, reliability of mixing and methods of packaging the two components are not of critical importance. Generally, precompressed foams have a great degree of dependability and require much less maintenance than other types of systems. Additionally, the foams are easily modifiable by varying density and adding fillers to improved lithium suppression and/or increase expansion on exposure to heat.

Modifications may include using glass microspheres, which fuse when heated, or copper particles, which form a "crust" when exposed to molten lithium. Also, the addition of expanding graphite (a generic material available commercially from many suppliers) may be advantageous, since carbon has been found to be effective in fighting lithium fires and heat causes expansion of this type of graphite to fill the hole. Other modifications include using expanding microballoons or microspheres which also provide added expansion on heating.

Example of silicone foams within the scope of the present invention, based on the Q37309 Silicone Foam Base and curing agent system, were produced for testing. The components of silicone foam, which include a silicone base and a curing agent which also acts as the foaming agent in the preferred embodiment, must be mixed very quickly before they start to foam, so a mechanical mixer is essential to making good quality foams. The foams are easily molded into uniform sheets of the desired density by mixing the proper weight of starting materials and pouring them into a mold which is then closed and held under pressure in a press for a suitable time until the foam has cured. Postcuring (e.g., a heat treatment after the initial room temperature cure cycle) for four hours at 100 degrees C. improves toughness and tear strength of the foam. In exemplary forms, the base material was successfully modified with 10% (by weight) of expandable graphite, 10% copper powder and a combination of 10% graphite and 10% copper powder. All three of these modifications were molded as 1" thick sheets for additional testing. The 1" thick molded sheets where then compressed to a thickness of ½" (i.e., 50% compression) between two metal plates. These foams were examined for compression set and Lithium compatibility.

Figure 6:
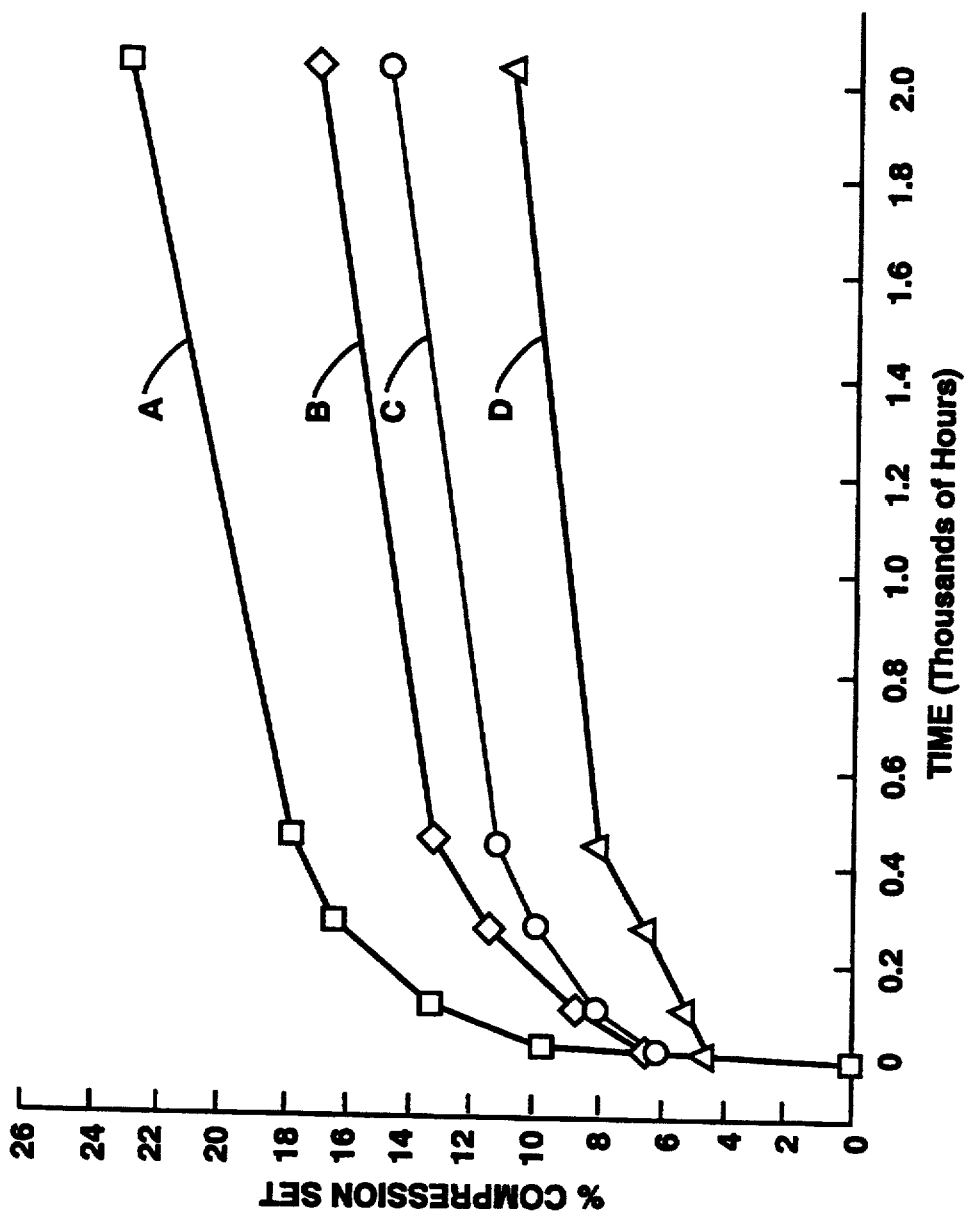
FIG. 6 is a graph illustrating characteristics of the polymer sealing system of the invention.

"Compression set" measures how well the foam returns to its original dimensions after it has been compressed and held for a time period. A low compression set is essential since the concept of precompressed foam depends on the material expanding when the shell is punctured after it has been held under a compressive force for a predetermined (e.g., prescribed depending on the material(s) used) time period. Testing at high temperature (e.g., 70 degrees C.) for 140 hours shows that these foams exhibit lower compression set after postcuring and that the addition of fillers increases the compression set. FIG. 6 illustrates the Compression Set after 2000 hours at room temperature at 50% compression (i.e., compressed to 50% of molded thickness) for the basic foam formulation, before and after postcuring (curves B and B, respectively), and the foam with both graphite and copper added, before and after postcuring (curves A and C, respectively). Both postcured samples (curves C and D) had compression set below 15%, which indicates good long term retention of properties.

Lithium compatibility was evaluated by pouring molten lithium at 500 degrees F. into a shallow well which had been molded into each test foam specimen. No damage was found on the basic foam specimen or any of the specimens molded from the foams with graphite or copper additives after 30 minutes of exposure.

Preliminary ballistic tests have been performed on a test specimen which included a 1-inch thick silicone foam, compressed to 0.5 inches between two ⅛-inch thick metal plates bolted together at widely spaced intervals around the perimeter.

When the shell is penetrated by a foreign object or the like, a void in the containment shell is created. The compressive forces resulting from storing this precompressed foam system under stress within the shell are released in the local area of the penetration, as shown in FIG. 1. This allows the foam to expand to fill the hole and to prevent the release of any lithium, thereby preventing the problems discussed above.

As an alternative to the preferred form of the invention described above, a polymer sealing system may be used which includes a combination of expanding microspheres and intumescent graphite particles in a urethane binder. The binder serves to hold the particles together. However, this concept has drawbacks in that when this material was exposed to a point source of heat, although the filler reacted as expected by expanding to fill the hole, the urethane binder was destroyed by the heat, and the resultant material was brittle and did not have sufficient physical strength to act as a fully effective seal.

Further, a self-sealing elastomeric bladder may be used as the polymer sealing system. The self-sealing elastomeric bladder is positioned inside the composite shell to contain a quick-curing polymer foam and force the foam into the hole created if the projectile pierced the boiler containment.

Another alternative to the preferred form of polymer sealing system described above is to employ phenolic-based resins, which generally have excellent high temperature properties and good fire resistance. Phenolic foams are two-part systems which react when mixed together to fill voids and harden quickly. The two components are individually sealed in polymer film "packages" or microspheres, which are packed in the containment shell. If a projectile penetrates the containment shell, the combination of actual puncturing of the film or microsphere and the heat and shock provides mixing and initiation of the reaction. Phenolic systems are commercially available from Georgia Pacific Corporation and British Petroleum, Inc. However, phenolic systems have several drawbacks. For example, the component systems have to mix and react very rapidly to fill the hole left by the projectile before a significant amount of lithium escapes. To evaluate these systems, "rise time" which is the amount of time necessary after initial mixing for the catalyst to react with the resin and produce a partially set foam, was examined. The phenolic systems examined had rise times in excess of two minutes which is unlikely to be fast enough for the intended use. Additionally, the resulting phenolic foams were very brittle, and not sufficiently flexible. It is envisioned that the phenolic systems may be modified to improve these properties.

Thus, in view of the alternative polymer sealing systems and their drawbacks as discussed above, silicone foam systems with low compressive set characteristics are preferably used for the polymer sealing system of the invention. "Low compressive set characteristics" are defined as compression set values of less than 15% after long term (e.g., 6 months or more) testing. The silicone foam systems preferably include the Dow Corning Q37309 Silicone Foam or other similar high temperature silicone foams.

The silicone foam systems may be improved by postcuring cycles. Postcuring cycles preferably include at least four hours curing at 100 degrees C. The silicone foam systems have proven to be resistant to attack by lithium at temperatures in excess of 500° F. for periods of 30 minutes or more. This lithium resistance feature is important in that it would allow enough time to remedy the safety hazard, i.e., evacuate and vent the torpedo room or enclosed space or the like.

Additives such as heat expandable graphite and heat expandable microballoons or microspheres can be included in the silicone foam formulations at concentrations up to 25% for graphite and 10% for microspheres to improve the sealing performance by causing additional expansion when exposed to the heat resulting from contact with the molten lithium. The heat expandable graphite consists of products such as an expanding graphite-Asbury Graphite Mills and the heat expandable microspheres consist of products such as Expancel 091DU. The heat expandable microballoons differ from the microspheres in that they have a lager diameter.

Copper powder (125 mesh, 10% by weight), also known as Navy 125S, may also be incorporated in the silicone foam both alone and in combination with other additives such as expanding graphite and microspheres. Copper fuses with lithium to form a solid crust which can also help to contain the flow of the lithium.

Further, Kevlar (e.g., up to 8% by weight) may be incorporated into the foam to improve the tear strength of the foam. For example, several lamina may be provided as a matrix for the foam.

Further, a self-sealing bladder constructed of an elastomer which may or may not be resistant to molten lithium when used alone, may be incorporated between the outer shell and the precompressed foam as an additional aid in containing the foam. In such an arrangement, the self-sealing bladder would serve as a pre-load on the foam.

In operation, the device is attached to the torpedo body by use of attaching means. When the shell is penetrated by a foreign object or the like such that an opening is formed in the outer surface of the shell to expose the lithium therewithin, the compressive forces resulting from storing this precompressed foam system under stress within the shell are released in the area of the penetration, as shown in FIG. 1. As a result, the silicone foam expands to fill and seal the hole and to prevent the release of any lithium. Thus, a reaction between lithium and water, water vapor, and air is prevented, thereby nullifying a substantial safety risk not addressed in conventional systems.

One of the major advantages of this system is that it minimizes the risk of fire and/or explosion as a result of a penetration of the MK50 boiler during storage, without impacting on its design characteristics when in actual use. Further, the device is easily installed, inexpensive, has little impact on surrounding systems and current handling procedures, and requires minimal maintenance.

As mentioned above, other compressible foams, such as Dow J-type Silastic Elastomer with a foaming agent, which can withstand short term heat excursions to 800° F., are resistant to attack by molten lithium, and have low compression sets can also be used alone or in combination with the additives described previously, in this precompressed foam sealing system.

A unitary or two-part polymer sealing system in which the curing and/or foaming action is initiated by heat, shock or the breaking of individual capsules of material on penetration may also be preferably contained within the clamp-on shell.

While the invention has been described in terms of a single preferred embodiment, those skilled in the art will recognize that the invention can be practiced with modification within the spirit and scope of the appended claims. For example, while the embodiment has been described in the context of an easily removable (e.g., clamp-on) protective system, it is envisioned that the protective system could be integrally formed with the container during the manufacture thereof and thus the protective system would be permanently and integrally attached to the container.

Having thus described my invention, what we claim as new and desire to secure by Letters Patent is as follows:

1. A removable protective device for mounting on and surrounding a localized section of a container containing a solid mass heat source and an initiator for heating the heat source to a temperature above a melting point of the heat source whereby the heat source is brought to a molten state in the localized section of the container surrounded by said protective device, said protective device comprising:
   a shell, said shell having inner and outer walls defining a space therebetween;
   self-sealing means positioned in said space, said self-sealing means being pre-compressed between said inner and outer walls; and
   mechanical mounting means for securably and releasably attaching said shell to the container, whereby upon said protective device being mounted to the container said self-sealing means act to seal a puncture in the container so as to prevent release of the molten heat source from the container.

2. A protective device according to claim 1, wherein said shell comprises two halves, each of said halves being formed by two sheets having semicircular cross-section, said sheets being joined together to define a space therebetween.

3. A protective device according to claim 2, wherein said means for self-sealing comprises pre-compressed silicone polymer foam positioned in said space between said two sheets.

4. A protective device according to claim 1, wherein said shell comprises metal.

5. A protective device according to claim 4, wherein said shell comprises steel.

6. A protective device according to claim 1, wherein said shell comprises high-temperature composite materials.

7. A protective device according to claim 1, further comprising a gasket for being positioned between an outer surface of said container and said inner wall of said shell.

8. A protective device according to claim 1, wherein said means for self-sealing comprises a high-temperature foam having a compression set of less than about 15% after at least 2000 hours compression.

9. A protective device according to claim 1, wherein said means for self-sealing comprises a silicone polymer foam.

10. A protective device according to claim 1, wherein said means for self-sealing comprises a two-part silicone foam.

11. A protective device according to claim 1, wherein said means for self-sealing comprises a two-part silicone foam having heat expandable graphite therein, said graphite being present in concentrations of up to 25%.

12. A protective device according to claim 1, wherein said means for self-sealing comprises a two-part silicone foam having heat expandable graphite therein, said foam having a density of substantially between 15 lb/ft$^3$ to 50 lb/ft$^3$.

13. A protective device according to claim 1, wherein said means for self-sealing includes means for fusing with the molten heat source in the container to form a solid crust to contain the flow of the molten heat source.

14. A protective device according to claim 1, wherein said means for self-sealing includes additives, said additives comprising at least one of heat-expandable graphite, heat-expandable microspheres, heat-expandable microballoons, and Kevlar.

15. A protective device according to claim 13, wherein said fusing means comprises copper powder.

16. A protective device according to claim 13, wherein said fusing means comprises copper powder and at least one of heat-expandable graphite, heat-expandable microspheres, and heat-expandable microballoons.

17. An improvement for a container containing therein a solid mass heat source and an initiator for heating said heat source to a temperature above a melting point of said heat source whereby said heat source is brought to a molten state, wherein the improvement comprises:
- a protective device adapted for mounting on said container, said protective device including a shell having inner and outer walls defining a space therebetween;
- a high-temperature foam positioned in said space, said high-temperature foam being pre-compressed between said inner and outer walls; and
- mechanical mounting means for securably and releasably attaching said shell to said container, whereby upon said protective device being mounted to said container said pre-compressed high-temperature foam acts to seal a puncture in said container so as to prevent release of said molten heat source from said container.

18. An improvement for a container as in claim 17, wherein said container is a torpedo, said torpedo including a casing containing therein a sealed boiler system, said boiler system containing therein said solid mass heat source and said initiator, said heat source being solid lithium, said shell comprises two halves, each of said halves being formed by two semicylindrical sheets joined together to define said inner and outer walls, said inner walls of said shell having inner diameters substantially equal to an outer diameter of said torpedo casing, and said high-temperature foam being a silicone polymer foam.

* * * * *